United States Patent
Lu et al.

(10) Patent No.: US 9,113,394 B2
(45) Date of Patent: Aug. 18, 2015

(54) METHOD FOR INDICATING CSG ID, METHOD FOR INDICATING BASE STATION TYPE, AND METHOD FOR OBTAINING CSG ID INDICATION

(75) Inventors: Zhaohua Lu, Shenzhen (CN); Feng Xie, Shenzhen (CN); Lin Chen, Shenzhen (CN); Kaiying Lv, Shenzhen (CN); Huiying Fang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 438 days.

(21) Appl. No.: 13/540,943

(22) Filed: Jul. 3, 2012

(65) Prior Publication Data
US 2012/0270590 A1  Oct. 25, 2012

Related U.S. Application Data

(63) Continuation of application No. PCT/CN2010/073481, filed on Jun. 2, 2010.

(30) Foreign Application Priority Data

Jan. 8, 2010 (CN) .......................... 2010 1 0000200

(51) Int. Cl.
*H04W 36/00* (2009.01)
*H04W 48/10* (2009.01)
*H04W 8/26* (2009.01)

(52) U.S. Cl.
CPC ................ *H04W 48/10* (2013.01); *H04W 8/26* (2013.01)

(58) Field of Classification Search
USPC ........... 455/424, 426.1, 435.2, 436–444, 450; 370/328
See application file for complete search history.

(56) References Cited

U.S. PATENT DOCUMENTS

| | | | |
|---|---|---|---|
| 7,634,272 B2 * | 12/2009 | Yamashita et al. | 455/444 |
| 8,270,357 B1 * | 9/2012 | Srinivas et al. | 370/329 |
| 8,848,656 B2 * | 9/2014 | Horn et al. | 370/331 |
| 2007/0183427 A1 * | 8/2007 | Nylander et al. | 370/395.2 |
| 2009/0042563 A1 * | 2/2009 | Bernard | 455/432.1 |
| 2009/0135784 A1 * | 5/2009 | Horn et al. | 370/331 |
| 2009/0238117 A1 * | 9/2009 | Somasundaram et al. | 370/328 |
| 2009/0288145 A1 * | 11/2009 | Huber et al. | 726/3 |
| 2009/0305665 A1 * | 12/2009 | Kennedy et al. | 455/410 |
| 2010/0069062 A1 * | 3/2010 | Horn et al. | 455/434 |
| 2010/0112982 A1 * | 5/2010 | Singh et al. | 455/411 |
| 2010/0124179 A1 * | 5/2010 | Lee et al. | 370/252 |
| 2010/0125899 A1 * | 5/2010 | Tinnakornsrisuphap et al. | 726/12 |
| 2010/0135201 A1 * | 6/2010 | Lewis et al. | 370/328 |
| 2011/0086641 A1 * | 4/2011 | Guvenc et al. | 455/437 |
| 2011/0111745 A1 * | 5/2011 | Li et al. | 455/422.1 |
| 2011/0134833 A1 * | 6/2011 | Gogic | 370/328 |

FOREIGN PATENT DOCUMENTS

| | | | | |
|---|---|---|---|---|
| CN | 101009909 A | 8/2007 | | H04Q 7/38 |
| CN | 101365231 A | 2/2009 | | H04Q 7/38 |

(Continued)

*Primary Examiner* — Dominic E Rego

(57) ABSTRACT

There are provided a method for indicating a CSG ID, a method for indicating a base station type and a method for obtaining CSG ID indication. The method for indicating the CSG ID includes: a base station notifying a terminal of whether the base station has a CSG ID. The present solution solves the problem of access delay in the related art resulted from that the terminal cannot obtain the specific base station type and whether the base station has a CSG ID, ensures the easy operation of the accessed base station information needing to be maintained by the terminal, and thus improves the quality of service of the whole system for the terminal.

6 Claims, 4 Drawing Sheets

(56) References Cited

FOREIGN PATENT DOCUMENTS

| CN | 101400075 A | 4/2009 | ............ H04W 24/04 |
| CN | 101415221 A | 4/2009 | ............ H04W 48/02 |
| CN | 101426255 A | 5/2009 | ............ H04W 48/10 |
| CN | 101572933 A | 11/2009 | ............ H04W 48/16 |
| CN | 102118827 A | 7/2011 | ............ H04W 48/02 |
| WO | WO2009/045969 A1 | 4/2009 | ............ H04W 48/02 |
| WO | WO2009/155967 A1 | 12/2009 | ............ H04W 48/16 |

* cited by examiner

METHOD FOR INDICATING CSG ID, METHOD FOR INDICATING BASE STATION TYPE, AND METHOD FOR OBTAINING CSG ID INDICATION

This is a continuation of International Application PCT/CN2010/073481, with an International Filing Date of Jun. 2, 2010, which claims priority to Chinese Application No. 201010000200.9, filed Jan. 8, 2010, each of which is incorporated by reference.

FIELD OF THE INVENTION

The present invention relates to the field of communication, in particular to a method for indicating a close subscriber group identifier (CSG ID), a method for indicating a base station type and a method for obtaining CSG ID indication.

BACKGROUND OF THE INVENTION

In a wireless communication system, a base station refers to a device for providing services for a terminal, and may communicate with the terminal via an uplink and/or a downlink, wherein the downlink (forward) refers to a direction from the base station to the terminal, and the uplink (backward) refers to a direction from the terminal to the base station. In usual applications, a plurality of terminals may simultaneously send data to the base station via the uplink, and may also simultaneously receive data from the base station via the downlink.

In mobile networks, wireless coverage quality is an important guarantee for the terminal to enjoy high-speed data, audio services and video services. At present, in order to realize the seamless coverage of wireless networks, the problems of indoor coverage and hotspot coverage need to be emphatically solved. The following two solutions can be mainly used for the coverage, one of which is increasing the number and density of Macro BS (viz. increasing the number and density of Macro Cell); the other of which is installing an indoor small base stations with low emitting power such as Femto BS (also referred to as personal BS) (also referred to as Femto Cell), a Pico BS (also referred to as Pico Cell), a Micro BS (also referred to as Micro Cell), or the like.

According to the Shannon principle, in the case where conventional Macro BSs are used for coverage, the occupation amount of frequency spectrum will approximate the capacity limit for the use of the frequency spectrum; even if the number of the Macro BSs with larger power is further increased, few improvements will be made for the indoor coverage and more irradiation pollution will be caused instead. While using small base stations such as Femto BSs, Pico BSs, Micro BSs, or the like may not only solve the problems of indoor coverage and hotspot coverage very well but also improve the system capacity based on the current frequency spectrum resources.

In Long Term Evolution (LTE) and IEEE 802.16 series standards, the Femto BS can either provide services for all the terminals (this type of Femto BS is called an Open Subscriber Group (OSG) type Femto BS) or provide services only for a group of specific authorized terminals (this type of Femto BS is called a Closed Subscriber Group (CSG) type Femto BS). The CSG type Femto BS can be divided into two types, CSG-Closed and CSG-Open, wherein the CSG-Closed type Femto BS generally provides services only for specific authorized terminals or terminals needing urgent services, while the CSG-open type Femto BS can provide services for other unauthorized users on the premise of ensuring the quality of service (QoS) for specific authorized users.

For facilitating a terminal to select a suitable Femto BS as a serving base station, an information list (also referred to as White List) including Femto BSs accessible to the terminal may generally be maintained in the terminal. The information list generally contains identifier information of each related Femto BS, and the identifier information may be either a BS JD of the Femto BS or a Closed Subscriber Group Identifier (CSG_ID) of the Femto BS. When the Femto BS is used by home users, the terminal generally maintains the BS_ID of the Femto BS; when the Femto BS is employed in an office building of an enterprise or some entertainment venues, hundreds of the Femto BSs might be present, which makes it difficult for the terminal to update in real time a list based on BS_ID information according to locations, and a large amount of terminal storing resources need to be occupied. Therefore, in this case, multiple Femto BSs can share one CSG ID, and the terminal can judge whether the Femto BS to be selected is a Femto BS accessible to the terminal according to the CSG ID information stored in the information list.

However, not all the Femto BSs have CSG IDs. Thus, it is necessary to allow the terminal to be informed of whether the Femto BS to be selected has a CSG ID and the BS type thereof, so as to facilitate the terminal to subsequently judge whether the Femto BS to be selected can provide services for the terminal according to the BS identifier or CSG ID. However, in the present applications, the terminal is not able to know the more specific BS type and whether the Femto BS has a CSG ID, and thus cannot judge according to the BS identifier or CSG ID in a subsequent process whether the Femto BS to be selected can provide services for the terminal.

SUMMARY OF THE INVENTION

The present invention mainly provides a method for indicating a CSG ID, a method for notifying a mapping relationship between a CSG ID and system parameter information, a method for obtaining CSG ID indication, and a method for indicating a base station type so as to at least solve the above problem.

According to an aspect of the present invention, a method for indicating a CSG ID is provided, which includes: a base station notifying a terminal of whether the base station has a CSG ID.

Specifically, the base station includes one of the followings: a Macro base station, a Micro base station, a Pico base station, and a Femto base station.

Specifically, the base station can notify the terminal of whether the base station has the CSG ID via a synchronization sequence, or a cell identifier, or a carrier frequency, or a control signaling.

Specifically, the step of the base station notifying the terminal of whether the base station has the CSG ID includes: the base station sending, according to a preset correspondence relationship between synchronization sequence(s) and indication information indicating whether to have the CSG ID, a synchronization sequence corresponding to the indication information indicating whether the base station has the CSG ID to the terminal.

Specifically, the step of the base station notifying the terminal of whether the base station has the CSG ID includes: the base station using, according to a preset correspondence relationship between cell identifier(s) and indication information indicating whether to have the CSG ID, a cell identifier corresponding to the indication information indicating whether the base station has the CSG ID.

Specifically, the step of the base station notifying the terminal of whether the base station has the CSG ID includes: the base station using, according to a preset correspondence relationship between carrier frequency(s) and indication information indicating whether to have the CSG ID, a carrier frequency corresponding to the indication information indicating whether the base station has the CSG ID during a process of sending information.

The correspondence relationship is pre-agreed between the base station and the terminal or the correspondence relationship is pre-notified to the terminal by a system, wherein the system comprises one of the followings: the base station, a network unit of an access service network, and a network unit of a connection service network.

Specifically, the step of the base station notifying the terminal of whether the base station has the CSG ID includes: the base station sending indication information to the terminal, wherein the indication information is used for indicating whether the base station has the CSG ID.

Specifically, the step of the base station sending the indication information to the terminal includes: the base station sending to the terminal a control message which contains the indication information, wherein the control message comprises at least one of the followings: a superframe header, a user-specific control message, a non-user-specific control message, and a medium access layer control message.

If the base station has the CSG ID, the method also includes: the base station transmitting a control message which contains the CSG ID, wherein the control message comprises at least one of the followings: a superframe header, a user-specific control message, a non-user-specific control message, and a medium access layer control message.

The method also includes: the base station sending a signaling to indicate whether to carry the CSG ID of the base station in a current superframe, or frame, or subframe, wherein the signaling is contained in a control message, wherein the control message comprises at least one of the followings: a superframe header, a user-specific control message, a non-user-specific control message, and a medium access layer control message.

After the base station notifies the terminal of whether the base station has the CSG ID, the method also includes: the terminal judging whether the base station has the CSG ID according to the notification of the base station, if it is judged that the base station has the CSG ID, the terminal judging whether it is allowed to send an access request to the base station according to a base station identifier and/or the CSG ID of the base station.

According to another aspect of the present invention, a method for notifying a mapping relationship between a CSG ID indication and system parameter information is provided, which includes: a system sending to a terminal a preset mapping relationship between indication information indicating whether a base station has a CSG ID and the system parameter information.

Preferably, the above system includes one of the followings: a base station, a network unit of an access service network, and a network unit of a connection service network.

Preferably, the system parameter information includes one of the followings: a synchronization sequence, a carrier frequency, and a cell identifier, wherein the synchronization sequence includes: a synchronization sequence sent on a primary synchronization channel and/or a synchronization sequence sent on a secondary synchronization channel.

According to still another aspect of the present invention, a method for obtaining CSG ID indication is provided, which includes: a terminal judging, according to a notification of a base station, whether the base station has a CSG ID.

In addition, the step of the terminal judging whether the base station has the CSG ID according to the notification of the base station includes: the terminal judging whether the base station has the CSG ID according to a system parameter used by the base station.

Preferably, the system parameter includes at least one of the followings: a primary synchronization sequence, a secondary synchronization sequence, a cell identifier, and a carrier frequency.

Preferably, a correspondence relationship between the system parameter and whether to have the CSG ID is pre-agreed between the base station and the terminal. Or the correspondence relationship is pre-notified by a system to the terminal.

In addition, the terminal judging whether the base station has the CSG ID according to the notification of the base station includes: the terminal receiving indication information sent by the base station, and judging whether the base station has the CSG ID according to the indication of the indication information, wherein the indication information is carried in a control signaling.

According to yet another aspect of the present invention, a method for indicating a base station type is provided, which includes: a Femto base station notifying a terminal of a base station type of the Femto base station, wherein the base station type includes an Enterprise Femto base station and/or a Home Femto base station.

Preferably, the Femto BS is a CSG type Femto BS.

In addition, when the base station type of the Femto base station is the Enterprise Femto base station, the Femto base station has a close subscriber group identifier (CSG ID).

In addition, when the Femto base station is the Enterprise Femto base station, the terminal judges, according to a CSG ID and/or a base station identifier (BS_ID), whether it is allowed to access the Femto base station; and when the Femto base station is the Home Femto base station, the terminal judges, according to a cell identifier and/or a BS_ID whether it is allowed to access the Femto base station.

Preferably, the step of the Femto base station notifying the terminal of the base station type of the Femto base station includes: the Femto base station using, according to a preset mapping relationship between the base station type and a system parameter, the system parameter corresponding to the base station type of the Femto base station to notify the terminal of the base station type of the Femto base station.

In addition, the system parameter includes one of the followings: a synchronization sequence, a cell identifier, and a carrier frequency.

Preferably, the mapping relationship between the base station type and the system parameter is notified by a system to the terminal and/or is set according to an agreement between the Femto base station and the terminal.

Preferably, information indicating the base station type is contained in a control signaling.

Preferably, the control signaling includes at least one of the followings: a superframe header, a user-specific control message, a non-user-specific control message, and a medium access layer control message.

By means of the present invention, the base station notifies the terminal of whether a CSG ID is present in the base station (or whether the base station has a CSG) and the specific base station type via the currently used system parameter or sending indication information to the terminal, which solves the problem of access delay in the related art resulted from that the terminal cannot obtain the specific base station type and whether the base station has a CSG ID, ensures the easy operation of the accessed base station information needing to be maintained by the terminal, and thus improves the quality of service of the whole system for the terminal.

BRIEF DESCRIPTION OF THE DRAWINGS

The drawings herein provide a further understanding of the present invention and constitute a part of the application. The illustrative embodiments of the present invention and the description thereof are used to explain the present invention rather than to unduly limit the present invention.

Wherein.

DETAILED DESCRIPTION OF THE PREFERRED EMBODIMENTS

The present invention will be described hereinafter in detail with reference to the drawings and in combination with the embodiments. It needs to be explained that, the embodiments of the present invention and the features of the embodiments can be combined with each other if there is no conflict.

According to an embodiment of the present invention, a method for indicating a CSG ID is first provided.

Figure 1:
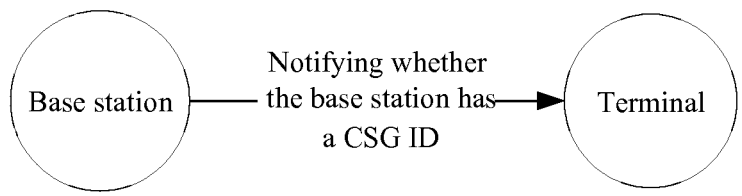
FIG. 1 is a schematic diagram of a method for indicating a CSG ID according to an embodiment of the present invention.

FIG. 1 is a schematic diagram of a method for indicating a CSG ID according to an embodiment of the present invention. As shown in FIG. 1, in the embodiment of the present invention, a base station initiatively notifies a terminal whether the base station has a CSG ID. Specifically, the base station can notify the terminal by the used system parameter or notifies the terminal by sending indication information to the terminal.

In a specific implementation process, the above base station includes but is not limited to: a Macro BS, a Micro BS, a Pico BS, and a Femto BS.

Preferably, the above base station is a Femto BS.

More preferably, the above base station is a CSG type Femto BS.

More preferably, the above base station is an Enterprise Femto BS or a Home Femto BS.

In a specific implementation process, the base station notifying the terminal of whether the base station has a CSG ID includes but is not limited to the following four modes:

Mode 1: the base station indicates whether the base station has the CSG ID by sending a synchronization sequence of a preset set to the terminal;

Mode 2: the base station notifies the terminal of whether the base station has the CSG ID by using a preset Cell ID;

Mode 3: the base station notifies the terminal of whether the base station has the CSG ID by using a preset carrier frequency; and Mode 4: the base station notifies the terminal of whether the base station has the CSG ID by sending indication information indicating whether the base station has the CSG ID to the terminal.

The above four modes will be respectively described hereinafter.

Mode 1

The base station notifies the terminal of whether the base station has the CSG ID by sending a specific primary synchronization sequence and/or secondary synchronization sequence.

Specifically, the correspondence relationship between the synchronization sequences and indication information indicating whether to have the CSG ID can be preset, viz, a set of the primary synchronization sequences and/or a set of the secondary synchronization sequences is divided into a number of subsets, the primary synchronization sequences or the secondary synchronization sequences of a certain subset are set to indicate that the base station has the CSG ID, while the primary synchronization sequences and/or the secondary synchronization sequences of the remaining subsets are used to indicate that the base station does not have the CSG ID. When sending a primary synchronization sequence and/or a secondary synchronization sequence, the base station sends a corresponding primary synchronization sequence and/or secondary synchronization sequence to the terminal depending on whether the base station has the CSG ID.

In a specific application, the information indicating the correspondence relationship between the indication information indicating whether to have the CSG ID and the primary synchronization sequences and/or the secondary synchronization sequences can be notified by the system to the terminal. Or the correspondence relationship can be pre-agreed between the base station and the terminal, viz. the correspondence relationship is set by default in the standard.

Mode 2

The base station notifies the terminal of whether the base station has the CSG ID by using a preset Cell ID.

Specifically, the correspondence relationship between Cell IDs and the indication information indicating whether to have the CSG ID can be preset, viz. a set of the Cell IDs are divided into a number of subsets, and the Cell IDs of a certain subset are set to indicate that the base station has the CSG ID, while the Cell IDs of the remaining subsets are used to indicate the base station does not have the CSG ID. The base station uses a Cell ID of a corresponding subset depending on whether the base station has the CSG ID.

In a specific application, the information indicating the correspondence relationship between the indication information indicating whether to have the CSG ID and the Cell IDs can be notified by the system to the terminal. Or the correspondence relationship can be pre-agreed between the base station and the terminal, viz, the correspondence relationship is set by default in the standard.

Mode 3

The base station notifies whether the base station has the CSG ID by using a preset carrier frequency.

Specifically, the correspondence relationship between carrier frequencies and the indication information indicating whether to have the CSG ID can be preset, viz. a set of the carrier frequencies are divided into a number of subsets, and the carrier frequencies of a certain subset are set to indicate that the base station has the CSG ID, while the carrier frequencies of the remaining subsets are used to indicate the base station does not have the CSG ID. The base station uses a carrier frequency of a corresponding subset depending on whether the base station has the CSG ID.

In a specific application, the information indicating the correspondence relationship between the indication information indicating whether to have the CSG ID and the carrier frequencies can be notified by the system to the terminal. Or the correspondence relationship can be pre-agreed between the base station and the terminal, viz. the correspondence relationship is set in a standard by default.

Mode 4

The base station indicates whether the base station has the CSG ID by sending the indication information to the terminal.

In a specific implementation process, the manner in which the base station sends the indication information includes but is not limited to broadcast, multicast, or unicast.

Moreover, in a specific application, the base station can send the above indication information by including the indication information in a control message, wherein the control message includes but is not limited to one of or any combination of the followings: a superframe header, a user-specific control message, a non-user-specific control message, a medium access layer control message (MAC Control Message, Medium Access Control), etc.

As for any one of the above four modes, if the base station has the CSG ID, the base station can transmit the CSG ID thereof by including the CSG ID in the control message, wherein the control message includes but is not limited to at least one of the followings: a superframe header, a user-specific control message, a non-user-specific control message, and a medium access layer control message (MAC Control Message, Medium Access Control, such as neighbor list message (AAI_NBR-ADV), system configuration descriptor message (AAI_System Configuration Descriptor (SCD) Message), etc.).

Preferably, the base station can send to the terminal a signaling indicating whether the CSG ID information of the base station is carried in the current superframe, or frame, or subframe.

Preferably, the above signaling can be contained and transmitted in a control message, such as a Superframe Header (SFH), or a user-specific control message, or a non-user-specific control message, or a medium access layer control message (MAC Message, Medium Access Control), or the like.

Moreover, a certain mapping relationship exists between the CSG ID and the BS_ID of the base station, viz. the CSG ID of the base station can be obtained based on the BS_ID of the base station according to a certain mapping relationship, or the BS_ID of the base station can be obtained based on the CSG ID of the base station according to a certain mapping relationship.

In a specific implementation process, the terminal can judge whether the base station has the CSG ID according to the notification of the base station. If the base station has the CSG ID, the terminal judges, according to the BS identifier and/or the CSG ID, whether it is allowed to send an access request to the base station, viz. judging whether the base station allows being accessed by the terminal; if it is judged that the base station does not have the CSG ID, the terminal can judge, according to the BS identifier of the base station, whether it is allowed to send an access request to the base station.

A method for notifying a mapping relationship between CSG ID indication and system parameter information according to an embodiment of the present invention is described hereinafter.

Figure 2:
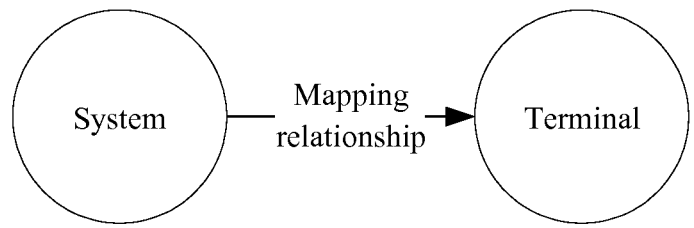
FIG. 2 is a schematic diagram of a method for notifying a mapping relationship between CSG ID indication and system parameter information according to an embodiment of the present invention.

FIG. 2 is a schematic diagram of a method for notifying a mapping relationship between CSG ID indication and system parameter information according to an embodiment of the present invention. As shown in FIG. 2, in the embodiment of the present invention, the system sends to the terminal a preset mapping relationship between indication information indicating whether to have the CSG ID and the system parameter information.

In a specific application, the above system includes but is not limited to: a base station, a network unit of an access service network, and a network unit of a connection service network.

In a specific implementation process, the manner in which the system sends the above mapping relationship includes but is not limited to broadcast, multicast, or unicast.

Specifically, the above system parameter information includes but is not limited to: a synchronization sequence, a carrier frequency, or a cell identifier.

Preferably, when the above system parameter information is a synchronization sequence, the synchronization sequence is a synchronization sequence sent on a primary synchronization channel and/or a synchronization sequence sent on a secondary synchronization channel, and the synchronization sequence can refer to all the synchronization sequences or part of the synchronization sequences in a network.

Preferably, when the above system parameter information is a carrier frequency, the carrier frequency can refer to all the carrier frequencies or part of the carrier frequencies in a network.

Preferably, when the above system parameter information is a cell identifier, the cell identifier can refer to all the cell identifiers or part of the cell identifiers in a network.

A method for obtaining CSG ID indication according to an embodiment of the present invention will be described hereinafter.

Figure 3:
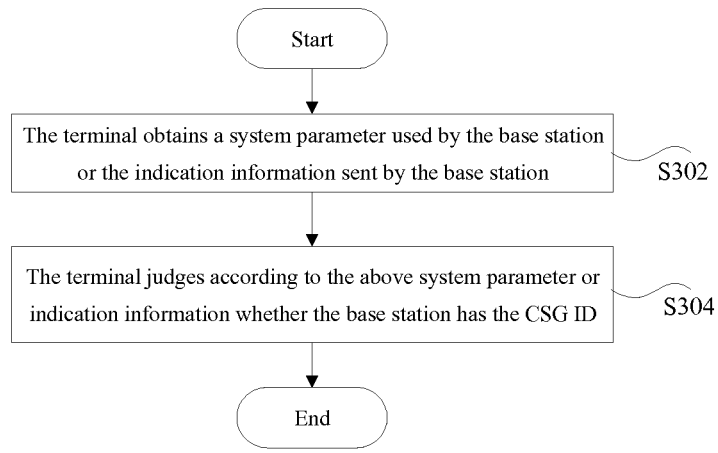
FIG. 3 is a flow chart of a method for obtaining CSG ID indication according to an embodiment of the present invention.

FIG. 3 is a flow chart of a method for obtaining CSG ID indication according to an embodiment of the present invention. As shown in FIG. 3, the method includes the following steps (step S302 to step S304):

Step S302, a terminal obtains a system parameter used by a base station or indication formation sent by a base station; and Step S304, the terminal judges whether the base station has a CSG ID according to the above system parameter or indication information.

In a specific implementation process, the above system parameter includes but is not limited to at least one of the followings: a primary synchronization sequence sent by the base station, a secondary synchronization sequence sent by the base station, a cell identifier of the base station, and a carrier frequency carrier used by the base station.

Further, a correspondence relationship between the above system parameter and whether to have the CSG ID is pre-agreed between the base station and the terminal, viz. being set by default in the standard, or the correspondence relationship is pre-notified by the system to the terminal, wherein the system includes one of the followings: a base station, a network unit of an access service network, and a network unit of a connection service network.

In the above step S304, if the terminal judges the base station has the CSG ID, the terminal judges according to the CSG ID and/or BS_ID of the base station whether the base station allows being accessed by the terminal. Specifically, if a correspondence relationship exists between any one of the CSG ID and BS_ID of the base station and the contents of an access list of the terminal, the terminal determines that the base station allows being accessed by the terminal. Preferably, when a correspondence relationship exists between the CSG ID of the base station and the contents of the access list of the terminal, the terminal determines that the base station allows being accessed by the terminal.

In the above step S304, if the terminal judges that the base station does not have the CSG ID, the terminal judges according to the BS_ID of the base station whether the base station allows being accessed by the terminal. Preferably, when a correspondence relationship exists between the BS ID and the contents of the access list of the terminal, the terminal determines that the base station allows being accessed by the terminal.

By virtue of the above technical solution provided in the embodiments of the present invention, the base station notifies the terminal of whether the base station has the CSG ID, and the terminal determines the subsequent processing needing to be performed according to the notification of the base station, which solves the problem of access delay in the related art resulted from that the terminal cannot know whether the base station has the CSG ID, ensures the easy operation of the information of the accessed base station needing to be maintained by the terminal, and thus improves the quality of service of the whole system for the terminal.

The above technical solutions provided by the embodiments of the present invention will be described hereinafter by way of specific embodiments.

Embodiment 1

Taking the IEEE 802.16 series standards as an example, a set of primary synchronization sequences is divided into a number of subsets, one of which (Primary Preamble Sequence Sub-Partition) is used for indicating that a base station has a CSG ID. Assuming that a base station BS-A has a CSG ID, the base station BS-A sends a primary synchronization sequence in the subset on a primary synchronization channel to notify the terminal that the base station BS-A has the CSG ID. In the embodiment, a mapping relationship between indication information indicating whether to have the CSG ID and the primary synchronization sequence can be set in the standard by default and/or can be notified by the base station (or other network elements of a system, such as a network unit of an access service network) to the terminal via a signaling.

The terminal, after receiving the primary synchronization sequence sent by the base station BS-A, judges that the primary synchronization sequence belongs to the above subset according to the above mapping relationship, thus, the terminal knows that the base station BS-A has a CSG ID.

Assuming that in a subsequent process the terminal first obtains the BS-ID of the base station BS-A and then obtains the CSG ID of the base station, the terminal first judges whether the base station BS-A allows being accessed by the terminal by comparing the BS_ID with its local access list (viz. to judge whether a correspondence relationship exists between the BS_ID and the contents of its local access list, that is, to judge whether the base station is included in the base stations identified in the access list according to the BS_ID); if it does not allow, the terminal further judges whether the base station BS-A allows being accessed by the terminal by comparing the CSG ID with its local access list; if it does not allow, the terminal does not take the base station as its access base station (viz. serving base station).

Assuming that the terminal first obtains the CSG-ID of the base station BS-A in a subsequent process and then obtains the BS_ID of the base station, the terminal first judges whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (viz. serving base station).

Assuming that the terminal obtains simultaneously the CSG-ID and BS_ID of the base station BS-A in a subsequent process, the terminal may first judge whether the base station BS-A allows being accessed by the terminal by comparing the CSG ID with its local access list; if it does not allow, the terminal further judges whether the base station BS-A allows being accessed by the terminal by comparing the BS_ID with its local access list, if it does not allow, the terminal does not take the base station as its access base station (serving base station); the terminal may also first judge whether the base station BS-A allows being accessed by the terminal by comparing the BS_ID with its local access list; if it does not allow, the terminal further judges whether the base station BS-A allows being accessed by the terminal by comparing the CSG ID with its local access list, if it does not allow, the terminal does not take the base station as its access base station (viz. serving base station); and the terminal may also judge by comparing simultaneously the BS_ID and the CSG ID with its local access list, if any one of the above two corresponds to the contents of its local access list of the terminal, the base station BS-A allows being accessed by the terminal, otherwise the base station does not allow being accessed by the terminal.

The base station BS-A may be a Macro BS, a Micro BS, a Pico BS, or a Femto BS, preferably a CSG type (including CSG-Closed and CSG-Open) Femto BS. More preferably, the base station BS-A is a CSG-Closed type Femto BS.

The base station BS-A can send its CSG ID by including the CSG ID in a superframe header, or send its CSG ID by including the CSG ID in a control message, which may be a user-specific control message, a non-user-specific control message, or a medium access layer message (MAC Message, Medium Access Control), preferably, a medium access layer message.

Moreover, the base station BS-A may indicate by sending a signaling whether the CSG ID information of the base station is carried in a current superframe, or frame, or subframe. Preferably, the signaling can be transmitted in a superframe header or in a control message. The control message may be a user-specific control message, a non-user-specific control message, or a medium access layer message (MAC Message, Medium Access Control) or the like.

Embodiment 2

Taking the IEEE 802.16 series standards as an example, a set of secondary synchronization sequences is divided into a number of subsets, one of which (Secondary Preamble Sequence Sub-Partition) is used for indicating that a base station has a CSG ID. Assuming that a base station BS-A has a CSG ID, the base station BS-A sends a secondary synchronization sequence in the subset on a secondary synchronization channel to notify the terminal that the base station BS-A has the CSG ID. In the embodiment, a mapping relationship between indication information indicating whether to have the CSG ID and the secondary synchronization sequence can be set in a standard by default and/or can be notified by the base station (or other network elements of a system, such as a network unit of an access service network) to the terminal via a signaling.

The terminal, after receiving the secondary synchronization sequence sent by the base station BS-A, judges that the secondary synchronization sequence belongs to the above subset according to the above mapping relationship, thus, the terminal knows that the base station BS-A has a CSG ID.

Assuming that in a subsequent process the terminal first obtains the BS-ID of the base station BS-A and then obtains the CSG ID of the base station, the terminal first judges whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station).

Assuming that the terminal first obtains the CSG-ID of the base station BS-A in a subsequent process and then obtains the BS_ID of the base station, the terminal first judges whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (viz. serving base station).

Assuming that the terminal obtains simultaneously the CSG-ID and BS_ID of the base station BS-A in a subsequent process, the terminal may first judge whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (serving base station); the terminal may also first judge whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station); the terminal may also judge by comparing simultaneously the BS ID and the CSG ID with its local access list, if any one of the above two corresponds to the contents of the local access list of the terminal, the base station BS-A allows being accessed by the terminal; otherwise the base station does not allow being accessed by the terminal.

The base station BS-A may be a Macro BS, a Micro BS, a Pico BS, or a Femto BS, preferably a CSG type (including CSG-Closed and CSG-Open) Femto BS. More preferably, the base station BS-A is a CSG-Closed type Femto BS.

The base station BS-A can send its CSG ID by including the CSG ID in a superframe header, or send its CSG ID by including the CSG ID in a control message, which may be a user-specific control message, a non-user-specific control message, or a medium access layer message (MAC Message, Medium Access Control), preferably, a medium access layer message.

Moreover, the base station BS-A may indicate by sending a signaling whether the CSG ID information of the base station is carried in a current superframe, or frame, or subframe. Preferably, the signaling can be transmitted in a superframe header or in a control message. The control message may be a user-specific control message, a non-user-specific control message, or a medium access layer message (MAC Message, Medium Access Control) or the like.

Embodiment 3

Taking the IEEE 802.16 series standards as an example, a set of primary synchronization sequences and secondary synchronization sequences is divided into a number of subsets, one of which (Secondary Preamble Sequence Sub-Partition) is used for indicating that a base station has a CSG ID. Assuming that a base station BS-A has a CSG ID, the base station BS-A sends a primary synchronization sequence in the subset on a primary synchronization channel and sends a secondary synchronization sequence in the subset on a secondary synchronization channel to notify the terminal that the base station BS-A has the CSG ID. In the embodiment, a mapping relationship between indication information indicating whether to have the CSG ID and the primary and secondary synchronization sequences can be set in a standard by default and/or can be notified by the base station to the terminal via a signaling.

The terminal, after receiving the primary and secondary synchronization sequences sent by the base station BS-A, judges that the primary and secondary synchronization sequences belong to the above subset according to the above mapping relationship, thus, the terminal knows that the base station BS-A has a CSG ID.

Assuming that in a subsequent process the terminal first obtains the BS-ID of the base station BS-A and then obtains the CSG ID of the base station, the terminal first judges whether the base station BS-A allows being accessed by the terminal by comparing the BS ID with its local access list; if it does not allow, the terminal further judges whether the base station BS-A allows being accessed by the terminal by comparing the CSG ID with its local access list; if it does not allow, the terminal does not take the base station as its access base station (viz. serving base station).

Assuming that the terminal first obtains the CSG-ID of the base station BS-A in a subsequent process and then obtains the BS_ID of the base station, the terminal first judges whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (viz. serving base station).

Assuming that the terminal obtains simultaneously the CSG-ID and BS_ID of the base station BS-A in a subsequent process, the terminal may first judge whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (serving base station); the terminal may also first judge whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station); the terminal may also judge by comparing simultaneously the BS_ID and the CSG ID with its local access list, if any one of the above two corresponds to the contents of the local access list of the terminal, the base station BS-A allows being accessed by the terminal; otherwise the base station does not allow being accessed by the terminal.

The base station BS-A may be a Macro BS, a Micro BS, a Pico BS, or a Femto BS, preferably a CSG type (including CSG-Closed and CSG-Open) Femto BS. More preferably, the base station BS-A is a CSG-Closed type Femto BS.

The base station BS-A can send its CSG ID by including the CSG ID in a superframe header, or send its CSG ID by including the CSG ID in a control message, which may be a user-specific control message, a non-user-specific control message, or a medium access layer message (MAC Message, Medium Access Control), preferably, a medium access layer message.

Moreover, the base station BS-A may indicate by sending a signaling whether the CSG ID information of the base station is carried in a current superframe, or frame, or subframe. Preferably, the signaling can be transmitted in a superframe header or in a control message. The control message may be a user-specific control message, a non-user-specific control message, or a medium access layer message (MAC Message, Medium Access Control) or the like.

Embodiment 4

Taking the IEEE 802.16 series standards as an example, a set of carrier frequencies is divided into a number of subsets, one of which is used for indicating that a base station has a CSG ID. Assuming that a base station BS-A has a CSG ID, then data and/or signaling are sent at a carrier frequency in the subset. In the embodiment, a mapping relationship between indication information indicating whether to have the CSG ID and the carrier frequencies can be set in a standard by default and/or can be notified by the base station to the terminal via a signaling.

When performing information interaction with the base station, the terminal learns that the current carrier frequency used by the base station BS-A is contained in the above subset, then the terminal knows that the base station BS-A has the CSG ID according to the above mapping relationship.

Assuming that in a subsequent process the terminal first obtains the BS-ID of the base station BS-A and then obtains the CSG ID of the base station, the terminal first judges whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station).

Assuming that the terminal first obtains the CSG-ID of the base station BS-A in a subsequent process and then obtains the BS_ID of the base station, the terminal first judges whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (viz. serving base station).

Assuming that the terminal obtains simultaneously the CSG-ID and BS_ID of the base station BS-A in a subsequent process, the terminal may first judge whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (serving base station); the terminal may also first judge whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station); the terminal may also judge by comparing simultaneously the BS_ID and the CSG ID with its local access list, if any one of the above two corresponds to the contents of the local access list of the terminal, the base station BS-A allows being accessed by the terminal; otherwise the base station does not allow being accessed by the terminal.

The base station BS-A may be a Macro BS, a Micro BS, a Pico BS, or a Femto BS, preferably a CSG type (including CSG-Closed and CSG-Open) Femto BS. More preferably, the base station BS-A is a CSG-Closed type Femto BS.

The base station BS-A can send its CSG ID by including the CSG ID in a superframe header, or send its CSG ID by including the CSG ID in a control message, which may be a user-specific control message, a non-user-specific control message, or a medium access layer message (MAC Message, Medium Access Control), preferably, a medium access layer message.

Moreover, the base station BS-A may indicate by sending a signaling whether the CSG ID information of the base station is carried in a current superframe, or frame, or subframe. Preferably, the signaling can be transmitted in a superframe header or in a control message. The control message may be a user-specific control message, a non-user-specific control message, or a medium access layer message (MAC Message, Medium Access Control) or the like.

Embodiment 5

Taking the IEEE 802.16 series standards as an example, cell identifiers (Cell IDs) are divided into a number of subsets, one of which is used for indicating that a base station has a CSG ID. Assuming that a base station BS-A has a CSG ID, then the cell identifier of the base station BS-A originates from the subset. In the embodiment, a mapping relationship between indication information indicating whether to have the CSG ID and the cell identifiers can be set in a standard by default and/or can be notified by the base station (the base station might be either BS-A or other base stations or network elements) to the terminal via a signaling (e.g., in a secondary superframe header S-SFH IE SP3 and/or AAI_SCD broadcast message).

Obtaining the cell identifier of the base station BS-A, the terminal can know whether the base station BS-A has the CSG ID according to the above mapping relationship.

Assuming that in a subsequent process the terminal first obtains the BS-ID of the base station BS-A and then obtains the CSG ID of the base station, the terminal first judges whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station).

Assuming that the terminal first obtains the CSG-ID of the base station BS-A in a subsequent process and then obtains the BS_ID of the base station, the terminal first judges whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (viz. serving base station).

Assuming that the terminal obtains simultaneously the CSG-ID and BS_ID of the base station BS-A in a subsequent process, the terminal may first judge whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (serving base station); the terminal may also first judge whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station); the terminal may also judge by comparing simultaneously the BS_ID and the CSG ID with its local access list, if any one of the above two corresponds to the contents of the local access list of the terminal, the base station BS-A allows being accessed by the terminal; otherwise the base station does not allow being accessed by the terminal.

The base station BS-A may be a Macro BS, a Micro BS, a Pico BS, or a Femto BS, preferably a CSG type (including CSG-Closed and CSG-Open) Femto BS. More preferably, the base station BS-A is a CSG-Closed type Femto BS.

The base station BS-A can send its CSG ID by including the CSG ID in a superframe header, or send its CSG ID by including the CSG ID in a control message, which may be a user-specific control message, a non-user-specific control message, or a medium access layer message (MAC Message, Medium Access Control), preferably, a medium access layer message.

Moreover, the base station BS-A may indicate by sending a signaling whether the CSG ID information of the base station is carried in a current superframe, or frame, or subframe. Preferably, the signaling can be transmitted in a superframe header or in a control message. The control message may be a user-specific control message, a non-user-specific control message, or a medium access layer message (MAC Message, Medium Access Control) or the like.

Embodiment 6

Taking the IEEE 802.16 series standards as an example, a base station BS-A sends indication information indicating whether the BS-A has a CSG ID via a control signaling. By the indication information, it is indicated for the terminal whether the base station has the CSG ID, wherein the indication information may be one field of the control signaling. Preferably, the indication information can be one bit (its value may be 0 or 1, and one value may be preset to indicate having the CSG ID). The above control signaling is preferably a superframe header (e.g., a secondary superframe header), or a medium access control message.

The terminal, after receiving the above control signaling sent by the base station BS-A, judges whether the base station BS-A has the CSG ID according to the indication information.

Assuming that the base station BS-A has the CSG ID and in a subsequent process the terminal first obtains the BS-ID of the base station BS-A and then obtains the CSG ID of the base station, the terminal first judges whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station).

Assuming that the base station BS-A has the CSG ID and in a subsequent process the terminal first obtains the CSG-ID of the base station BS-A and then obtains the BS_ID of the base station, the terminal first judges whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (viz. serving base station).

Assuming that the base station BS-A has the CSG ID and the terminal obtains simultaneously the CSG-ID and BS_ID of the base station BS-A in a subsequent process, the terminal may first judge whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (serving base station); the terminal may also first judge whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station); the terminal may also judge by comparing simultaneously the BS_ID and the CSG ID with its local access list, if any one of the above two corresponds to the contents of the local access list of the terminal, the base station BS-A allows being accessed by the terminal; otherwise the base station does not allow being accessed by the terminal.

The base station BS-A may be a Macro BS, a Micro BS, a Pico BS, or a Femto BS, preferably a CSG type (including CSG-Closed and CSG-Open) Femto BS. More preferably, the base station BS-A is a CSG-Closed type Femto BS.

The base station BS-A can send its CSG ID by including the CSG ID in a superframe header, or send its CSG ID by including the CSG ID in a control message, which may be a user-specific control message, a non-user-specific control message, or a medium access layer message (MAC Message, Medium Access Control), preferably, a medium access layer message.

Moreover, the base station BS-A may indicate by sending a signaling whether the CSG ID information of the base station is carried in a current superframe, or frame, or subframe. Preferably, the signaling can be transmitted in a superframe header or in a control message. The control message may be a user-specific control message, a non-user-specific control message, or a medium access layer message (MAC Message, Medium Access Control) or the like.

The above Embodiment 1 to Embodiment 6 describe the method for indicating the CSG ID according to embodiments of the present invention. In the above Embodiment 1 to Embodiment 6, assuming that the base station BS-A indicates that the BS-A does not have the CSG ID, the terminal then judges whether the base station BS-A is a base station allowing being accessed by the terminal by comparing the BS_ID of the base station BS-A with an access list locally maintained by the terminal.

In the above Embodiment 1 to Embodiment 6, assuming that the base station BS-A indicates that it has the CSG ID, the terminal then judges whether the base station BS-A is a base station allowing being accessed by the terminal by comparing the CSG ID of the base station BS-A with an access list locally maintained by the terminal. No repetition is made herein.

In the above Embodiment 1 to Embodiment 6, the body notifying the terminal of a mapping relationship between indication information indicating whether to have the CSG ID and system parameter information (including the above synchronization sequence, carrier frequency and cell identifier) may also be network elements of an access service network, or network elements of a connection service network, or particular system devices (e.g., a computer, a server, and a card reader/writer), or other network units, the manner of wire connection or wireless connection may be used to notify the terminal of the related mapping relationship.

A method for notifying a mapping relationship between the CSG ID indication and system parameter information according to embodiments of the present invention is described hereinafter by Embodiment 7 to Embodiment 2.

Embodiment 7

A system notifies, via a control signaling, a terminal of a mapping relationship between indication information indicating whether to have a CSG ID and all of or part of primary synchronization sequences in a network. For example, the system has M primary synchronization sequences, wherein N primary synchronization sequences (N≤M) can be used to indicate that a base station has a CSG ID, thus, the system can notify, via a control signaling, the terminal of a correspondence relationship between the primary synchronization sequences and CSG ID indication information.

After receiving the above mapping relationship, the terminal can judge whether the base station has the CSG ID according to the mapping relationship and a primary synchronization sequence (viz. a synchronization sequence sent on a primary synchronization channel) currently sent by the base station. For example, when a base station BS-A has a CSG ID, then the primary synchronization sequence sent by the base station BS-A on the primary synchronization channel must be one of the above N primary synchronization sequences. The terminal finds, after receiving the primary synchronization sequence of the base station BS-A, that the primary synchronization sequence is one of the above N primary synchronization sequences, thus, the terminal knows that the base station BS-A has the CSG-ID.

The above system may be a base station, a network element of an access service network, a network element of a connection service network, or particular system devices (e.g., a computer, a server, and a card reader/writer), notifying the terminal of the related mapping relationship by way of wire connection or wireless connection.

The above mapping relationship may also be a mapping relationship between indication information and all of or part of sequences of a sequence set constituted by primary and secondary synchronization sequences. When the primary and secondary synchronization sequences used by the base station both originate from the sequence set indicating that the base station has the CSG ID, it is indicated that the base station has the CSG ID, otherwise the base station does not have the CSG ID.

The base station BS-A may be a Macro BS, a Micro BS, a Pico BS, or a Femto BS, preferably a CSG type (including CSG-Closed and CSG-Open) Femto BS. More preferably, the base station BS-A is a CSG-Closed type Femto BS.

Embodiment 8

A system notifies, via a control signaling, a terminal of a mapping relationship between indication information indicating whether to have a CSG ID and all of or part of secondary synchronization sequences. For example, the system has M secondary synchronization sequences, wherein N secondary synchronization sequences (N≤M) can be used to indicate that a base station has a CSG ID, thus, the system can notify, via a control signaling, the terminal of a correspondence relationship between the secondary synchronization sequences and CSG ID indication information.

After receiving the above mapping relationship, the terminal can judge whether the base station has the CSG ID according to the mapping relationship and a secondary synchronization sequence (viz. a synchronization sequence sent on a secondary synchronization channel) currently sent by the base station. For example, when a base station BS-A has a CSG ID, then the primary synchronization sequence sent by the base station BS-A on the secondary synchronization channel must be one of the above N secondary synchronization sequences. The terminal finds, after receiving the secondary synchronization sequence of the base station BS-A, that the secondary synchronization sequence is one of the above N secondary synchronization sequences, thus, the terminal knows that the base station BS-A has the CSG-ID.

The above system may be a base station, a network element of an access service network, a network element of a connection service network, or particular system devices (e.g., a computer, a server, and a card reader/writer), notifying the terminal of the related mapping relationship by way of wire connection or wireless connection.

The above mapping relationship may also be a mapping relationship between indication information and all of or part of sequences of a sequence set constituted by primary and secondary synchronization sequences. When the primary and secondary synchronization sequences used by the base station both originate from the sequence set indicating that the base station has the CSG ID, it is indicated that the base station has the CSG ID, otherwise the base station does not have the CSG ID.

The base station BS-A may be a Macro BS, a Micro BS, a Pico BS, or a Femto BS, preferably a CSG type (including CSG-Closed and CSG-Open) Femto BS. More preferably, the base station BS-A is a CSG-Closed type Femto BS.

Embodiment 9

A system notifies, via a control signaling, a terminal of a mapping relationship between CSG ID indication information and all of or part of cell identifiers (Cell IDs) in the system. For example, the system has M cell identifiers, wherein N cell identifiers (N≤M) can be used to indicate that a base station has a CSG ID, thus, the system can notify, via a control signaling, the terminal of a correspondence relationship between the cell identifiers and the CSG ID indication information.

After receiving the above mapping relationship, the terminal can judge whether the base station has the CSG ID according to the mapping relationship and the current cell identifier of the base station. For example, when the base station BS-A has the CSG ID, the cell identifier of the base station BS-A must be one of the above N cell identifiers. The terminal finds, after obtaining the cell identifier of the base station BS-A, that the cell identifier is one of the above N cell identifiers, thus, the terminal knows that the base station BS-A has the CSG-ID.

The above system may be a base station, a network element of an access service network, a network element of a connection service network, or particular system devices (e.g., a computer, a server, and a card reader/writer), notifying the terminal of the related mapping relationship by way of wire connection or wireless connection.

The base station BS-A may be a Macro BS, a Micro BS, a Pico BS, or a Femto BS, preferably a CSG type (including CSG-Closed and CSG-Open) Femto BS. More preferably, the base station BS-A is a CSG-Closed type Femto BS.

Embodiment 10

A system notifies, via a control signaling, a terminal of a mapping relationship between CSG ID indication information and all of or part of carrier frequencies. For example, the system has M carrier frequencies, wherein N carrier frequencies (N≤M) can be used to indicate that a base station has a CSG ID, thus, the system can notify, via a control signaling, the terminal of a correspondence relationship between the carrier frequencies and CSG ID indication information.

After receiving the above mapping relationship, the terminal can judge whether the base station has the CSG ID according to the mapping relationship and a carrier frequency currently used by the base station. For example, when the base station BS-A has the CSG ID, the carrier frequencies used by the base station BS-A must include one of the above N carrier frequencies. The terminal finds, after obtaining the carrier frequency used by the base station BS-A, that the carrier frequency is one of the above N carrier frequencies, thus, the terminal knows that the base station BS-A has the CSG-ID.

The above system may be a base station, a network element of an access service network, a network element of a connection service network, or particular system devices (e.g., a computer, a server, and a card reader/writer), notifying the terminal of the related mapping relationship by way of wire connection or wireless connection.

The base station BS-A may be a Macro BS, a Micro BS, a Pico BS, or a Femto BS, preferably a CSG type (including CSG-Closed and CSG-Open) Femto BS. More preferably, the base station BS-A is a CSG-Closed type Femto BS.

A method for obtaining CSG ID indication according to embodiments of the present invention is described hereinafter by Embodiment 11 to Embodiment 14.

Embodiment 11

A mapping relationship exists between indication information indicating whether a base station has a CSG ID and primary synchronization sequence(s). Assuming that a base station BS-A has a CSG ID, the base station BS-A sends a primary synchronization sequence, which indicates that the base station BS-A has the CSG ID information, on a primary synchronization channel.

Figure 4:
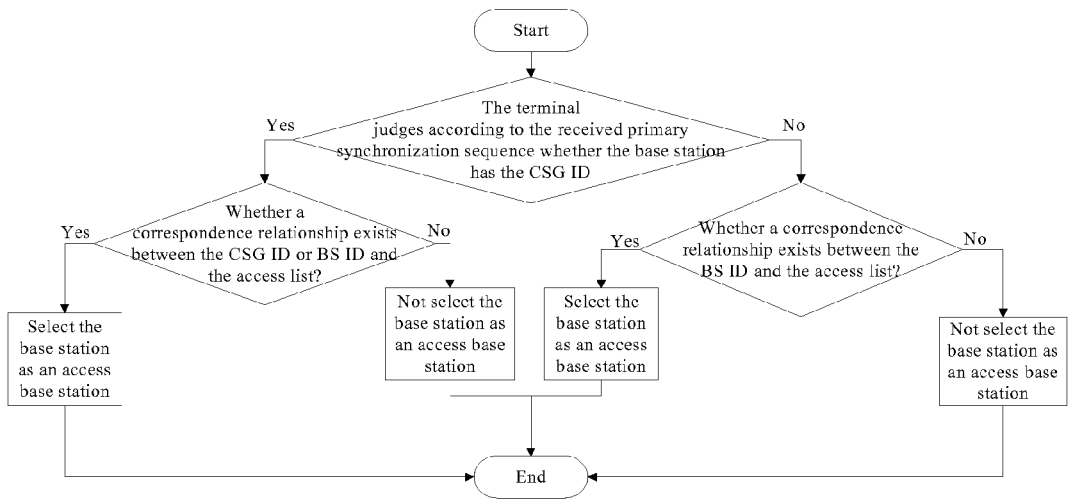
FIG. 4 is a flow chart of a terminal selecting an accessed base station according to Embodiment 11 of the present invention.

After obtaining the primary synchronization sequence sent by the base station BS-A, the terminal finds that the base station BS-A has the CSG ID. As shown in FIG. 4, the terminal compares its access list with the CSG ID or BS_ID of the base station BS-A. If a correspondence relationship exists between any one of the two IDs and the access list, the terminal judges that the base station BS-A is a base station allowing being accessed by the terminal itself, otherwise the base station BS-A is a base station not allowing being accessed by the terminal itself.

The base station BS-A is a Macro BS, a Micro BS, a Pico BS, or a Femto BS, preferably a CSG-Closed type Femto BS or a CSG type (including CSG-Closed and CSG-Open) Femto BS.

Embodiment 12

A mapping relationship exists between indication information indicating whether a base station has a CSG ID and secondary synchronization sequence(s). Assuming that a base station BS-A has a CSG ID, the base station BS-A sends a secondary synchronization sequence, which indicates that the base station BS-A has the CSG ID information, on a secondary synchronization channel.

Figure 5:
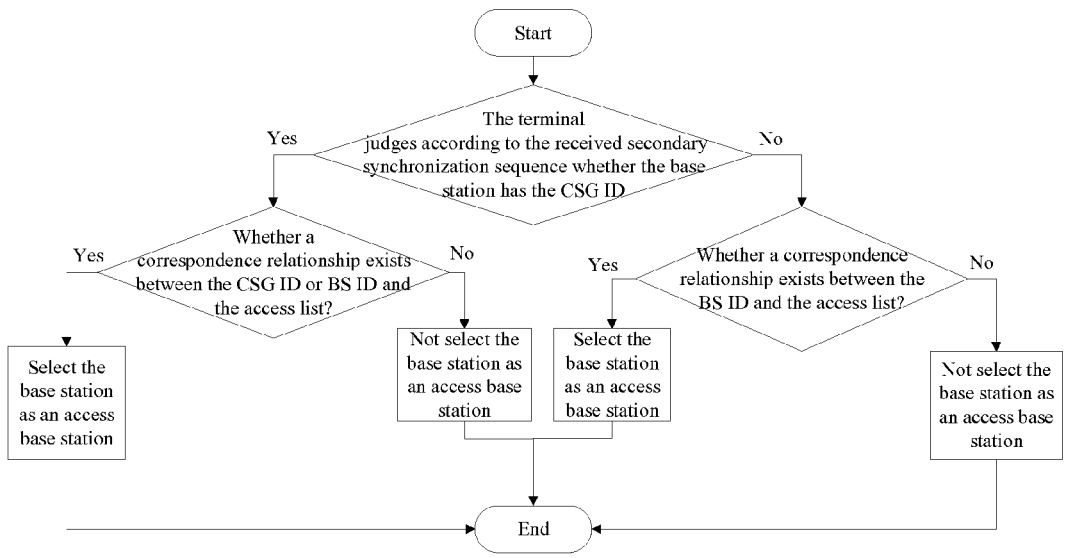
FIG. 5 is a flow chart of a terminal selecting an accessed base station according to Embodiment 12 of the present invention.

After obtaining the secondary synchronization sequence sent by the base station BS-A, the terminal finds that the base station BS-A has the CSG ID. As shown in FIG. 5, the terminal compares its access list with the CSG ID or BS_ID of the base station BS-A. If a correspondence relationship exists between any one of the two IDs and the access list, the terminal judges that the base station BS-A is a base station allowing being accessed by the terminal itself, otherwise the base station BS-A is a base station not allowing being accessed by the terminal itself.

The base station BS-A is a Macro BS, a Micro BS, a Pico BS, or a Femto BS, preferably a CSG-Closed type Femto BS or a CSG type (including CSG-Closed and CSG-Open) Femto BS.

Embodiment 13

A mapping relationship exists between indication information indicating whether a base station has a CSG ID and cell identifier(s). Assuming that a base station BS-A has a CSG ID, the base station BS-A uses a cell identifier indicating that the base station BS-A has the CSG ID.

Figure 6:
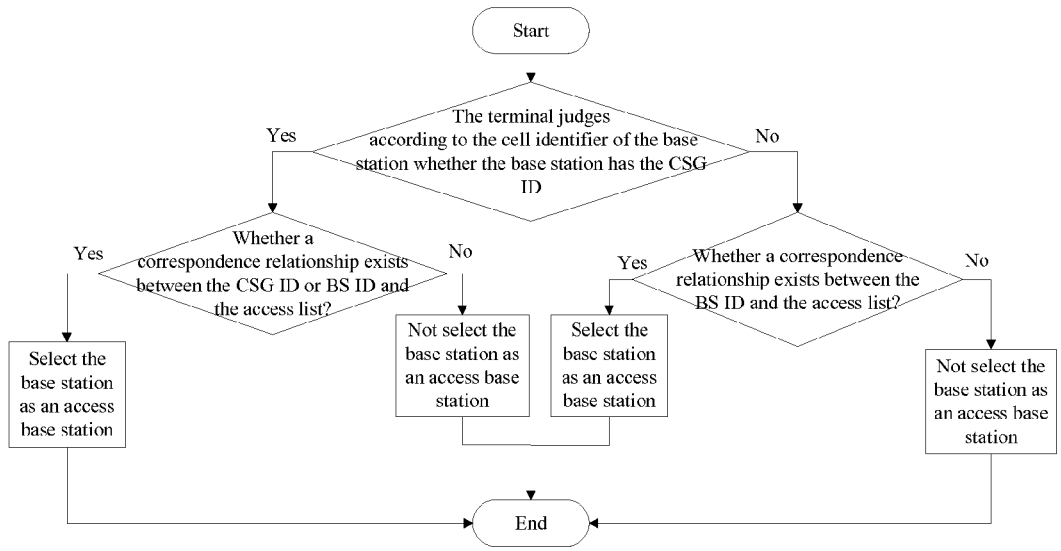
FIG. 6 is a flow chart of a terminal selecting an accessed base station according to Embodiment 13 of the present invention.

After obtaining the cell identifier of the base station BS-A, the terminal finds that the base station BS-A has the CSG ID. As shown in FIG. 6, the terminal compares its access list with the CSG ID or BS_ID of the base station BS-A. If a correspondence relationship exists between any one of the two IDs and the access list, the terminal judges that the base station BS-A is a base station allowing being accessed by the terminal itself, otherwise the base station BS-A is a base station not allowing being accessed by the terminal itself.

The base station BS-A is a Macro BS, a Micro BS, a Pico BS, or a Femto BS, preferably a CSG-Closed type Femto BS or a CSG type (including CSG-Closed and CSG-Open) Femto BS.

Embodiment 14

A mapping relationship exists between indication information indicating whether a base station has a CSG ID and carrier frequency(s). Assuming that a base station BS-A has a CSG ID, the base station BS-A uses a carrier frequency, which indicates that the base station BS-A has the CSG ID, to send a signaling and/or data.

Figure 7:
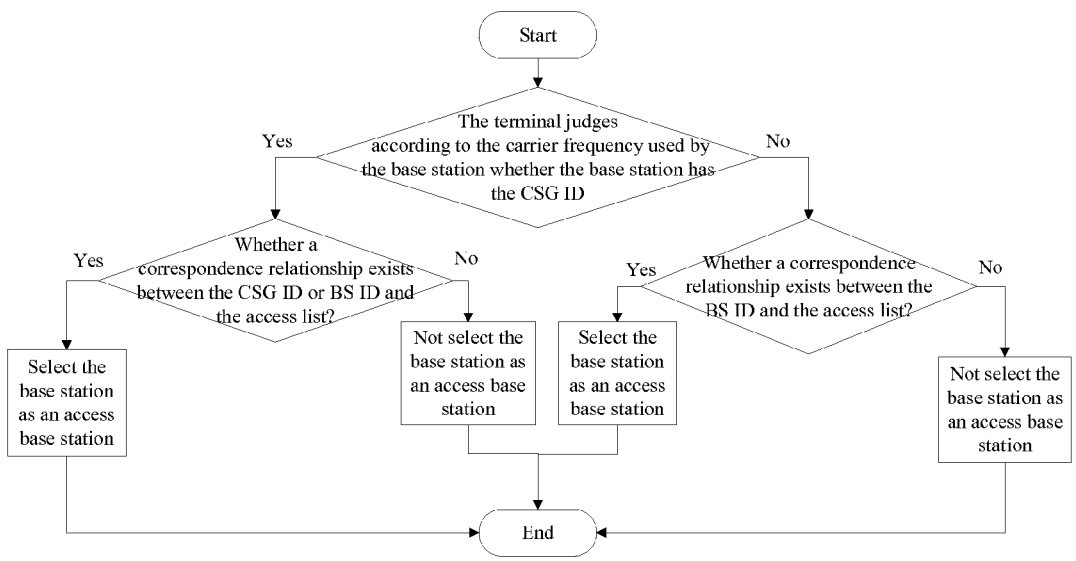
FIG. 7 is a flow chart of a terminal selecting an accessed base station according to Embodiment 14 of the present invention.

After obtaining the carrier frequency used by the base station BS-A, the terminal finds that the base station BS-A has the CSG ID. As shown in FIG. 7, the terminal compares its access list with the CSG ID or BS_ID of the base station BS-A. If a correspondence relationship exists between any one of the two IDs and the access list, the terminal judges that the base station BS-A is a base station allowing being accessed by the terminal itself, otherwise the base station BS-A is a base station not allowing being accessed by the terminal itself.

The base station BS-A is a Macro BS, a Micro BS, a Pico BS, or a Femto BS, preferably a CSG-Closed type Femto BS or a CSG type (including CSG-Closed and CSG-Open) Femto BS.

In Embodiment 11 to Embodiment 14, assuming that the base station BS-A indicates it has the CSG ID via the indication information, the terminal compares the CSG ID of the base station BS-A with the access list locally maintained by the terminal, and then judges whether the base station BS-A is a base station allowing being accessed by the terminal itself. No repetition is made herein.

What needs to be explained is, in the above Embodiment 1 to Embodiment 14, the terminal judges whether the base station allows being accessed by the terminal itself via the CSG ID or BS_ID, which is merely one of the conditions for judging whether the terminal is allowed to access the base station. If the base station notifies via other signaling (e.g., a Cell Bar field in a secondary superframe header) that the base station does not allow being accessed or reaccessed by any terminal currently, the terminal shall not access the base station. Likewise, the Cell ID of the base station may also be one of the conditions for judging whether the terminal is allowed to access the base station.

According to an embodiment of the present invention, there is provided a method for indicating a base station type.

A Femto BS having s CSG ID means that multiple Femto BSs share one CSG, thus, this type of Femto BS can be called a Multi-cell Femto BS; moreover, since this type of Femto BS is mainly needed by enterprises, it can also be called an Enterprise Femto BS. A Femto BS having no CSG ID means that a single Femto BS has a separate CSG, therefore, it can be called a Single-Cell Femto BS, and this type of Femto BS is mainly needed by families or individuals and thus can be also called Home Femto BS. The CSG type Femto BS can be further divided into a CSG-Closed Enterprise Femto BS, a CSG-Open Enterprise Femto BS, a CSG-Closed Home Femto BS, and a CSG-Open Home Femto BS.

When the Femto BS is an Enterprise Femto BS, CSG ID information generally needs to be sent to a terminal.

Figure 8:
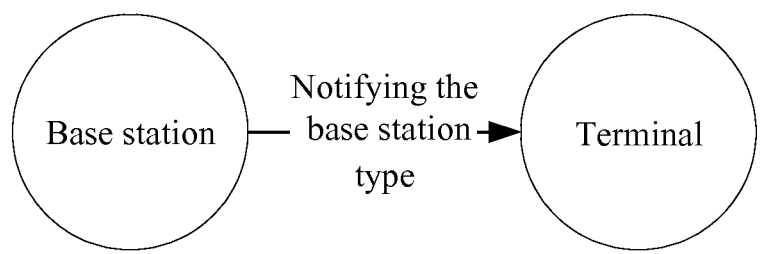
FIG. 8 is a schematic diagram of a method for indicating a base station type according to an embodiment of the present invention.

FIG. 8 is a schematic diagram of a method for indicating a base station type according to an embodiment of the present invention. As shown in FIG. 8, in the embodiment of the present invention, the base station initiatively notifies a terminal a base station type of the base station. Specifically, the base station notifies the terminal by the system parameter being used or notifies the terminal by sending indication information to the terminal.

In a specific implementation process, the above base station includes but is not limited to: a Macro BS, a Micro BS, a Pico BS, and a Femto BS.

Preferably, the above base station is a Femto BS.

More preferably, the above base station is a CSG type Femto BS.

More preferably, the above base station is an Enterprise Femto BS or a Home Femto BS.

In a specific implementation process, the base station notifying the terminal of the base station type of the base station includes but is not limited to the following four modes:

Mode 1: the base station indicates the base station type of the base station by sending a synchronization sequence of a preset set to the terminal;

Mode 2: the base station notifies the terminal of the base station type of the base station by using a preset Cell ID;

Mode 3: the base station notifies the terminal of the base station type of the base station by using a preset carrier frequency; and Mode 4: the base station notifies the terminal of the base station type of the base station by sending indication information indicating the base station type of the base station to the terminal.

The above four modes will be respectively described hereinafter.

Mode 1

The base station notifies the terminal of the base station type of the base station by sending a specific primary synchronization sequence and/or secondary synchronization sequence.

Specifically, the correspondence relationship between the synchronization sequence and the base station type can be preset, viz. a set of the primary synchronization sequences and/or a set of the secondary synchronization sequences is divided into a number of subsets, all of or part of which are set to indicate different base station types. When sending a primary synchronization sequence and/or a secondary synchronization sequence, the base station sends a corresponding primary synchronization sequence and/or secondary synchronization sequence to the terminal depending on its base station type.

In a specific application, the information indicating the correspondence relationship between the base station type and the primary synchronization sequences and/or the secondary synchronization sequences can be notified by the system to the terminal. Or the correspondence relationship can be pre-agreed between the base station and the terminal, viz. the correspondence relationship is set by default in the standard.

Mode 2

The base station notifies the terminal of the base station type of the base station by using a preset Cell ID.

Specifically, the correspondence relationship between Cell IDs and the base station type can be preset, viz. a set of the Cell IDs are divided into a number of subsets, all of or part of which are set to indicate different base station types. The base station uses a Cell ID of a corresponding subset depending upon its base station type.

In a specific application, the information indicating the correspondence relationship between the base station type and the Cell IDs can be notified by the system to the terminal. Or the correspondence relationship can be pre-agreed between the base station and the terminal, viz, the correspondence relationship is set in the standard by default.

Mode 3

The base station notifies the base station type of the base station by using a preset carrier frequency.

Specifically, the correspondence relationship between carrier frequencies and the base station type can be preset, viz. a set of the carrier frequencies are divided into a number of subsets, all of or part of which are set to indicate different base station types. The base station uses a carrier frequency of a corresponding subset depending upon its base station type.

In a specific application, the information of the correspondence relationship between the base station type and the carrier frequencies can be notified by the system to the terminal. Or the correspondence relationship can be pre-agreed between the base station and the terminal, viz. the correspondence relationship is set in a standard by default.

Mode 4

The base station indicates the base station type of the base station by sending a control signaling including base station type information to the terminal.

In a specific implementation process, the manner in which the base station sends the control signaling includes but is not limited to broadcast, multicast, or unicast.

Moreover, in a specific application, the base station can send the above base station type information by including the base station type information in a control message such as a superframe header, a user-specific control message, a non-user-specific control message, a medium access layer control message (MAC Control Message, Medium Access Control, e.g., neighbor list message (AAI_NBR-ADV), system configuration descriptor message (AAI_System Configuration Descriptor (SCD) Message, etc.), or the like.

In a specific implementation process, the terminal can obtain the base station type information of the base station according to the notification of the base station. When the base station is a CSG type Enterprise Femto BS, the terminal judges whether it is allowed to access the base station according to the CSG ID and/or the BS_ID. When the Femto BS is a CSG type Home Femto BS, the terminal judges whether it is allowed to access the base station according to the cell identifier and/or the BS_ID.

The method for notifying a mapping relationship between a base station type and system parameter information according to embodiments of the present invention will be described hereinafter.

Embodiment 15

Taking the IEEE 802.16 series standards as an example, a set of primary synchronization sequences is divided into a number of subsets, part of or all of which (Primary Preamble Sequence Sub-Partition) correspond to a specific base station type. Assuming that the base station BS-A is a CSG type Enterprise Femto BS, the base station BS-A sends a primary synchronization sequence in the subset on a primary synchronization channel to notify the terminal of its base station type, wherein a mapping relationship between the base station type and the primary synchronization sequences can be set in a standard by default and/or cab be notified by the base station (or other network elements of a system, such as a network unit of an access service network) to the terminal via a signaling.

The terminal, after receiving the primary synchronization sequence sent by the base station BS-A, judges that the primary synchronization sequence belongs to the above subset according to the above mapping relationship, thus, the terminal knows the base station type of the base station BS-A and that the base station BS-A has the CSG ID.

Assuming that in a subsequent process the terminal first obtains the BS-ID of the base station BS-A and then obtains the CSG ID of the base station, the terminal first judges whether the base station BS-A allows being accessed by the terminal by comparing the BS ID with its local access list (viz. to judge whether a correspondence relationship exists between the BS_ID and the contents of its local access list, that is, to judge whether the base station is included in the base stations identified in the access list according to the BS_ID); if it does not allow, the terminal further judges whether the base station BS-A allows being accessed by the terminal by comparing the CSG ID with its local access list; if it does not allow, the terminal does not take the base station as its access base station (viz. serving base station).

Assuming that the terminal first obtains the CSG-ID of the base station BS-A in a subsequent process and then obtains the BS_ID of the base station, the terminal first judges whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (viz. serving base station).

Assuming that the terminal obtains simultaneously the CSG-ID and BS_ID of the base station BS-A in a subsequent process, the terminal may first judge whether the base station BS-A allows being accessed by the terminal by comparing the CSG ID with its local access list; if it does not allow, the terminal further judges whether the base station BS-A allows being accessed by the terminal by comparing the BS_ID with its local access list, if it does not allow, the terminal does not take the base station as its access base station (serving base station); the terminal may also first judge whether the base station BS-A allows being accessed by the terminal by comparing the BS_ID with its local access list; if it does not allow, the terminal further judges whether the base station BS-A allows being accessed by the terminal by comparing the CSG ID with its local access list, if it does not allow, the terminal does not take the base station as its access base station (viz. serving base station); and the terminal may also judge by comparing simultaneously the BS_ID and the CSG ID with its local access list, if any one of the above two corresponds to the contents of its local access list of the terminal, the base station BS-A allows being accessed by the terminal, otherwise the base station does not allow being accessed by the terminal.

The base station BS-A may be a Macro BS, a Micro BS, a Pico BS, or a Femto BS, preferably a CSG type (including CSG-Closed and CSG-Open) Femto BS. More preferably, the base station BS-A is a CSG type Enterprise Femto BS or a CSG type Home Femto BS.

The base station BS-A can send its CSG ID by including the CSG ID in a superframe header, or send its CSG ID by including the CSG ID in a control message, which may be a user-specific control message, a non-user-specific control message, or a medium access layer message (MAC Message, Medium Access Control), preferably, a medium access layer message.

Moreover, the base station BS-A may indicate by sending a signaling whether the CSG ID information of the base station is carried in a current superframe, or frame, or subframe. Preferably, the signaling can be transmitted in a superframe header or in a control message. The control message may be a user-specific control message, a non-user-specific control message, or a medium access layer message (MAC Message, Medium Access Control) or the like.

Embodiment 16

Taking the IEEE 802.16 series standards as an example, a set of secondary synchronization sequences is divided into a number of subsets, part of or all of which (Secondary Preamble Sequence Sub-Partition) correspond to a specific base station type. Assuming that the base station BS-A is a CSG type Enterprise Femto BS, the base station BS-A sends a secondary synchronization sequence in the subset on a secondary synchronization channel to notify the terminal its base station type, wherein a mapping relationship between the base station type and the secondary synchronization sequences can be set in a standard by default and/or can be notified by the base station (or other network elements of a system, such as a network unit of an access service network) to the terminal via a signaling.

The terminal, after receiving the secondary synchronization sequence sent by the base station BS-A, judges that the secondary synchronization sequence belongs to the above subset according to the above mapping relationship, thus, the terminal knows the base station type of the base station BS-A and that the base station BS-A has a CSG ID.

Assuming that in a subsequent process the terminal first obtains the BS-ID of the base station BS-A and then obtains the CSG ID of the base station, the terminal first judges whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station).

Assuming that the terminal first obtains the CSG-ID of the base station BS-A in a subsequent process and then obtains the BS_ID of the base station, the terminal first judges whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (viz, serving base station).

Assuming that the terminal obtains simultaneously the CSG-ID and BS_ID of the base station BS-A in a subsequent process, the terminal may first judge whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (serving base station); the terminal may also first judge whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station); the terminal may also judge by comparing simultaneously the BS_ID and the CSG ID with its local access list, if any one of the above two corresponds to the contents of the local access list of the terminal, the base station BS-A allows being accessed by the terminal; otherwise the base station does not allow being accessed by the terminal.

The base station BS-A may be a Macro BS, a Micro BS, a Pico BS, or a Femto BS, preferably a CSG type (including CSG-Closed and CSG-Open) Femto BS. More preferably, the base station BS-A is a CSG type Enterprise Femto BS or a CSG type Home Femto BS.

The base station BS-A can send its CSG ID by including the CSG ID in a superframe header, or send its CSG ID by including the CSG ID in a control message, which may be a user-specific control message, a non-user-specific control message, or a medium access layer message (MAC Message, Medium Access Control), preferably, a medium access layer message.

Moreover, the base station BS-A may indicate by sending a signaling whether the CSG ID information of the base station is carried in a current superframe, or frame, or subframe. Preferably, the signaling can be transmitted in a superframe header or in a control message. The control message may be a user-specific control message, a non-user-specific control message, or a medium access layer message (MAC Message, Medium Access Control) or the like.

Embodiment 17

Taking the IEEE 802.16 series standards as an example, a set of primary synchronization sequences and secondary synchronization sequences is divided into a number of subsets, part of or all of which (Secondary Preamble Sequence Sub-Partition) correspond to a specific base station type. Assuming that the base station BS-A is a CSG type Enterprise Femto BS, the base station BS-A sends a primary synchronization sequence in the subset on a primary synchronization channel and a secondary synchronization sequence in the subset on a secondary synchronization channel to notify the terminal of its base station type, wherein a mapping relationship between the base station type and the primary and secondary synchronization sequences can be set in a standard by default and/or can be notified by the base station to the terminal via a signaling.

The terminal, after receiving the primary and secondary synchronization sequences sent by the base station BS-A, judges that the primary and secondary synchronization sequences belong to the above subset according to the above mapping relationship, thus, the terminal knows the base station type of the base station BS-A and that the base station BS-A has the CSG ID.

Assuming that in a subsequent process the terminal first obtains the BS-ID of the base station BS-A and then obtains the CSG ID of the base station, the terminal first judges whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station).

Assuming that the terminal first obtains the CSG-ID of the base station BS-A in a subsequent process and then obtains the BS_ID of the base station, the terminal first judges whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (viz. serving base station).

Assuming that the terminal obtains simultaneously the CSG-ID and BS_ID of the base station BS-A in a subsequent process, the terminal may first judge whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (serving base station); the terminal may also first judge whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz, serving base station); the terminal may also judge by comparing simultaneously the BS_ID and the CSG ID with its local access list, if any one of the above two corresponds to the contents of the local access list of the terminal, the base station BS-A allows being accessed by the terminal; otherwise the base station does not allow being accessed by the terminal.

The base station BS-A may be a Macro BS, a Micro BS, a Pico BS, or a Femto BS, preferably a CSG type (including CSG-Closed and CSG-Open) Femto BS. More preferably, the base station BS-A is a CSG type Enterprise Femto BS or a CSG type Home Femto BS.

The base station BS-A can send its CSG ID by including the CSG ID in a superframe header, or send its CSG ID by including the CSG ID in a control message, which may be a user-specific control message, a non-user-specific control message, or a medium access layer message (MAC Message, Medium Access Control), preferably, a medium access layer message.

Moreover, the base station BS-A may indicate by sending a signaling whether the CSG ID information of the base station is carried in a current superframe, or frame, or subframe. Preferably, the signaling can be transmitted in a superframe header or in a control message. The control message may be a user-specific control message, a non-user-specific control message, or a medium access layer message (MAC Message, Medium Access Control) or the like.

Embodiment 18

Taking the IEEE 0.802.16 series standards as an example, a set of carrier sequences is divided into a number of subsets, part of or all of which correspond to a specific base station type. Assuming that the base station BS-A is a CSG type Enterprise Femto BS, then data and/or signaling are sent at the carrier frequency in the subset, wherein a mapping relationship between the base station type and the carrier frequencies can be set in a standard by default and/or can be notified by the base station to the terminal via a signaling.

When performing information interaction with the base station, the terminal learns that the current carrier frequency used by the base station BS-A is contained in the above subset, then the terminal knows the base station type of the base station BS-A and that the base station BS-A has the CSG ID according to the above mapping relationship.

Assuming that in a subsequent process the terminal first obtains the BS-ID of the base station BS-A and then obtains the CSG ID of the base station, the terminal first judges whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station).

Assuming that the terminal first obtains the CSG-ID of the base station BS-A in a subsequent process and then obtains the BS_ID of the base station, the terminal first judges whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (viz. serving base station).

Assuming that the terminal obtains simultaneously the CSG-ID and BS_ID of the base station BS-A in a subsequent process, the terminal may first judge whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (serving base station); the terminal may also first judge whether the base station BS-A allows being accessed by the terminal by comparing the BS_ID with its local access list; if it does not allow, the terminal further judges whether the base station BS-A allows being accessed by the terminal by comparing the CSG JD with its local access list; if it does not allow, the terminal does not take the base station as its access base station (viz. serving base station); the terminal may also judge by comparing simultaneously the BS_ID and the CSG ID with its local access list, if any one of the above two corresponds to the contents of the local access list of the terminal, the base station BS-A allows being accessed by the terminal; otherwise the base station does not allow being accessed by the terminal.

The base station BS-A may be a Macro BS, a Micro BS, a Pico BS, or a Femto BS, preferably a CSG type (including CSG-Closed and CSG-Open) Femto BS. More preferably, the base station BS-A is a CSG type Enterprise Femto BS or a CSG type Home Femto BS.

The base station BS-A can send its CSG ID by including the CSG ID in a superframe header, or send its CSG ID by including the CSG ID in a control message, which may be a user-specific control message, a non-user-specific control message, or a medium access layer message (MAC Message, Medium Access Control), preferably, a medium access layer message.

Moreover, the base station BS-A may indicate by sending a signaling whether the CSG ID information of the base station is carried in a current superframe, or frame, or subframe. Preferably, the signaling can be transmitted in a superframe header or in a control message. The control message may be a user-specific control message, a non-user-specific control message, or a medium access layer message (MAC Message, Medium Access Control) or the like.

Embodiment 19

Taking the IEEE 802.16 series standards as an example, cell identifiers (Cell IDs) are divided into a number of subsets, part of or all of which correspond to a specific base station type. Assuming that the base station BS-A is a CSG type Enterprise Femto BS, then the cell identifier of the base station BS-A originates from the subset, wherein a mapping relationship between the base station type and the cell identifier can be set in a standard by default and/or can be notified by the base station (the base station might be either BS-A or other base stations or network elements) to the terminal via a signaling (e.g., in a secondary superframe header S-SFH IE SP3 and/or AAI_SCD broadcast message).

Obtaining the cell identifier of the base station BS-A, the terminal can know the base station type and that the base station BS-A has the CSG ID according to the above mapping relationship.

Assuming that in a subsequent process the terminal first obtains the BS-ID of the base station BS-A and then obtains the CSG ID of the base station, the terminal first judges whether the base station BS-A allows being accessed by the terminal by comparing the BS_ID with its local access list; if it does not allow, the terminal further judges whether the base station BS-A allows being accessed by the terminal by comparing the CSG ID with its local access fist; if it does not allow, the terminal does not take the base station as its access base station (viz. serving base station).

Assuming that the terminal first obtains the CSG-ID of the base station BS-A in a subsequent process and then obtains the BS_ID of the base station, the terminal first judges whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (viz. serving base station).

Assuming that the terminal obtains simultaneously the CSG-ID and BS_ID of the base station BS-A in a subsequent process, the terminal may first judge whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (serving base station); the terminal may also first judge whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station); the terminal may also judge by comparing simultaneously the BS_ID and the CSG ID with its local access list, if any one of the above two corresponds to the contents of the local access list of the terminal, the base station BS-A allows being accessed by the terminal; otherwise the base station does not allow being accessed by the terminal.

The base station BS-A may be a Macro BS, a Micro BS, a Pico BS, or a Femto BS, preferably a CSG type (including CSG-Closed and CSG-Open) Femto BS. More preferably, the base station BS-A is a CSG type Enterprise Femto BS or a CSG type Home Femto BS.

The base station BS-A can send its CSG ID by including the CSG ID in a superframe header, or send its CSG ID by including the CSG ID in a control message, which may be a user-specific control message, a non-user-specific control message, or a medium access layer message (MAC Message, Medium Access Control), preferably, a medium access layer message.

Moreover, the base station BS-A may indicate by sending a signaling whether the CSG ID information of the base station is carried in a current superframe, or frame, or sub-frame. Preferably, the signaling can be transmitted in a superframe header or in a control message. The control message may be a user-specific control message, a non-user-specific control message, or a medium access layer message (MAC Message, Medium Access Control) or the like.

Embodiment 20

Taking the IEEE 802.16 series standards as an example, the base station BS-A sends its base station type information via a control signaling, wherein the base station type information can be one field of the control signaling, and the above control signaling is preferably a superframe header (e.g., a secondary superframe header), or a medium access control message.

The terminal, after receiving the above control signaling sent by the base station BS-A, obtains the base station type of the base station BS-A according to the indication information.

Assuming that the base station BS-A has the CSG ID and in a subsequent process the terminal first obtains the BS-ID of the base station BS-A and then obtains the CSG ID of the base station, the terminal first judges whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station).

Assuming that the base station BS-A has the CSG ID and in a subsequent process the terminal first obtains the CSG-ID of the base station BS-A and then obtains the BS_ID of the base station, the terminal first judges whether the base station BS-A allows being accessed by the terminal by comparing the CSG ID with its local access list; if it does not allow, the terminal further judges whether the base station BS-A allows being accessed by the terminal by comparing the BS_ID with its local access fist; if it does not allow, the terminal does not take the base station as its access base station (viz. serving base station).

Assuming that the base station BS-A has the CSG ID and the terminal obtains simultaneously the CSG-ID and BS_ID of the base station BS-A in a subsequent process, the terminal may first judge whether the base station BS-A allows being accessed by the terminal by comparing the CSG ID with its local access list; if it does not allow, the terminal further judges whether the base station BS-A allows being accessed by the terminal by comparing the BS_ID with its local access list; if it does not allow, the terminal does not take the base station as its access base station (serving base station); the terminal may also first judge whether the base station BS-A allows being accessed by the terminal by comparing the BS_ID with its local access list; if it does not allow, the terminal further judges whether the base station BS-A allows being accessed by the terminal by comparing the CSG ID with its local access list; if it does not allow, the terminal does not take the base station as its access base station (viz. serving base station); the terminal may also judge by comparing simultaneously the BS_ID and the CSG ID with its local access list, if any one of the above two corresponds to the contents of the local access list of the terminal, the base station BS-A allows being accessed by the terminal; otherwise the base station does not allow being accessed by the terminal.

The base station BS-A may be a Macro BS, a Micro BS, a Pico BS, or a Femto BS, preferably a CSG type (including CSG-Closed and CSG-Open) Femto BS. More preferably, the base station BS-A is a CSG-Closed type Femto BS.

The base station BS-A can send its CSG ID by including the CSG ID in a superframe header, or send its CSG ID by including the CSG ID in a control message, which may be a user-specific control message, a non-user-specific control message, or a medium access layer message (MAC Message, Medium Access Control), preferably, a medium access layer message.

Moreover, the base station BS-A may indicate by sending a signaling whether the CSG ID information of the base station is carried in a current superframe, or frame, or subframe. Preferably, the signaling can be transmitted in a superframe header or in a control message. The control message may be a user-specific control message, a non-user-specific control message, or a medium access layer message (MAC Message, Medium Access Control) or the like.

The above Embodiment 15 to Embodiment 20 describe the method for indicating the base station type according to embodiments of the present invention. In the above Embodiment 15 to Embodiment 20, assuming that the base station type of the base station BS-A is a CSG type Home Femto BS, which indicates that the base station does not have the CSG ID, the terminal then judges whether the base station BS-A is a base station allowing being accessed by the terminal itself by comparing the BS-ID and/or cell identifier of the base station BS-A with an access list locally maintained by the terminal.

In the above Embodiment 15 to Embodiment 20, assuming that the base station type of the base station BS-A is a CSG type Enterprise Femto BS, which indicates that the base station has the CSG ID, the terminal then judges whether the base station BS-A is a base station allowing being accessed by the terminal itself by comparing the CSG ID of the base station BS-A with an access list locally maintained by the terminal. No repetition is made herein.

In the above Embodiment 15 to Embodiment 20, the body notifying the terminal of a mapping relationship between indication information indicating whether to have the base station type and the system parameter information (including the above synchronization sequence, carrier frequency, and cell identifier) may also be network elements of an access service network, or network elements of a connection service network, or particular system devices (e.g., a computer, a server, and a card reader/writer), or other network units, the manner of wire connection or wireless connection may be used to notify the terminal of the related mapping relationship.

What needs to be explained is, in the above Embodiment 15 to Embodiment 20, the terminal judges whether the base station allows being accessed by the terminal itself via the CSG ID or BS_ID, which is merely one of the conditions for judging whether the terminal is allowed to access the base station. If the base station notifies via other signaling (e.g., a Cell Bar field in a secondary superframe header) that the base station does not allow being accessed or reaccessed by any terminal currently, the terminal shall not access the base station. Likewise, the Cell ID of the base station may also be one of the conditions for judging whether the terminal is allowed to access the base station.

From the above description, it can be concluded that, in the embodiment of the present invention, the base station notifies the terminal of whether a CSG ID is present in the base station (or whether the base station has a CSG) and the specific base station type via the currently used system parameter or sending indication information to the terminal, which solves the problem of access delay in the related art resulted from that the terminal cannot obtain the specific base station type and whether the base station has a CSG ID, ensures the easy operation of the accessed base station information needing to be maintained by the terminal, and thus improves the quality of service of the whole system for the terminal.

Obviously, those skilled in the art shall understand that the respective modules or respective steps of the present invention as mentioned above can be realized by a conventional computing apparatus, which can be integrated into a single computing apparatus or distributed over a network composed of multiple computing apparatus. Alternatively, they can be realized by a program code executable by the computing apparatus, therefore, they can be stored in a storage apparatus to be executed by the computing apparatus, or they are manufactured into respective integrated circuit modules, respectively, or multiple modules or steps thereof are manufactured into a single integrated circuit module. In this way, the present invention is not limited to any specific combination of hardware and software.

The descriptions above are only preferable embodiments of the present invention, which are not used to restrict the present invention. For the person skilled in the art, the present invention may have various changes and variations. Any amendments, equivalent substitutions, improvements etc. within the spirit and principle of the present invention are all concluded in the scope of protection of the present invention.

What is claimed is:

1. A method for indicating a base station type, the method comprising:
   a Femto base station notifying a terminal of a base station type of the Femto base station, wherein the base station type comprises an Enterprise Femto base station and/or a Home Femto base station;
   wherein the Femto base station is a close subscriber group (CSG) type Femto base station;
   when the base station type of the Femto base station is the Enterprise Femto base station, the Femto base station notifies the terminal a close subscriber group identifier (CSG ID) of the Femto base station, and the terminal judges whether it is able to access the Femto base station according to the CSG ID;
   when the Femto base station is the Home Femto base station, the terminal judges, according to a cell identifier and/or a BS ID, whether it is able to access the Femto base station.

2. The method according to claim 1, wherein the step of the Femto base station notifying the terminal of the base station type of the Femto base station comprises:
   the Femto base station using, according to a preset mapping relationship between the base station type and a system parameter, the system parameter corresponding to the base station type of the Femto base station to notify the terminal of the base station type of the Femto base station.

3. The method according to claim 2, wherein the system parameter comprises one of the followings: a synchronization sequence, a cell identifier, and a carrier frequency.

4. The method according to claim 2, wherein the mapping relationship between the base station type and the system parameter is notified by a system to the terminal and/or is set according to an agreement between the Femto base station and the terminal.

5. The method according to claim 1, wherein information indicating the base station type is contained in a control signaling.

6. The method according to claim 5, wherein the control signaling comprises at least one of the followings:
   a superframe header, a user-specific control message, a non-user-specific control message, and a medium access layer control message.

* * * * *